United States Patent [19]

Murayama et al.

[11] Patent Number: 5,683,050
[45] Date of Patent: Nov. 4, 1997

[54] HANDLE FOR A FISHING REEL SHAPED TO PROVIDE A NATURAL GRIP AND EASY FISHLINE REMOVAL

[75] Inventors: Tomohiro Murayama; Takashi Shibata, both of Tokyo, Japan

[73] Assignee: Daiwa Seiko, Inc., Tokyo, Japan

[21] Appl. No.: 542,929

[22] Filed: Oct. 13, 1995

[30] Foreign Application Priority Data

Oct. 14, 1994 [JP] Japan ................. 6-013845 U

[51] Int. Cl.$^6$ ..................... A01K 89/01; A01K 89/015
[52] U.S. Cl. ..................... 242/283; 74/545; D22/141
[58] Field of Search ..................... 242/283, 284; 74/545; D22/141, 142

[56] References Cited

U.S. PATENT DOCUMENTS

| D. 281,190 | 10/1985 | Sakai | D22/141 |
|---|---|---|---|
| D. 295,775 | 5/1988 | Kameda | D22/141 |
| D. 299,512 | 1/1989 | Kameda | D22/141 |
| D. 350,587 | 9/1994 | Storz | D22/141 |
| 2,251,168 | 7/1941 | Ronnick | 242/283 X |
| 3,148,913 | 9/1964 | Golde | 74/545 X |

FOREIGN PATENT DOCUMENTS

| 296648 | 7/1994 | Germany | 242/283 |
|---|---|---|---|
| 61-118251 | 7/1986 | Japan . | |
| 2-40786 | 10/1990 | Japan . | |
| 4-1808 | 1/1992 | Japan . | |

*Primary Examiner*—Daniel P. Stodola
*Assistant Examiner*—Emmanuel M. Marcelo
*Attorney, Agent, or Firm*—Sughrue, Mion, Zinn, Macpeak & Seas, PLLC

[57] ABSTRACT

A handle of a fishing reel in which, even if a fishline is twined around a handle knob, the fishline can be removed easily there from. The handle knob also can be held easily outside thereof with the fingertips. In the handle of the fishing reel, a handle knob is rotatably mounted on the end portion of a handle arm. The shape of each of the hold surfaces of the handle knob to be held with the thumb and forefinger during a fishline winding operation is formed such that it is tapered from the base portion side of the handle arm toward the outer end portion side thereof. Accordingly, when the fishline is twined around the handle knob, the fishline can be removed from the twined state thereof. Also, the handle knob can be grasped easily from a position outward of the knob with the angler's fingertips.

17 Claims, 4 Drawing Sheets

HANDLE FOR A FISHING REEL SHAPED TO PROVIDE A NATURAL GRIP AND EASY FISHLINE REMOVAL

BACKGROUND OF THE INVENTION

1. Field of the Invention

The present invention relates to an improvement in a handle of a fishing reel.

2. Description of the Prior Art

As disclosed in Japanese Utility Model Publications No. 61-118251 of Showa, No. 2-40786 of Heisei, and No. 4-1808 of Heisei, a typical fishing reel handle, which is mounted on a winding drive part of a reel main body to wind a fishline around a spool, has a knob rotatably supported on an end portion of a handle arm and adapted to be pinched with fingers for rotation of the fishing reel handle.

However, the outer periphery of the handle knob is generally formed in a straight shape or is formed so as to increase gradually in diameter from the base portion thereof toward the leading end. As a result, first if a fishline is twined around the handle knob due to loosening or twisting of the fishline during the fishline winding operation, it becomes difficult to remove the fishline from the twined state thereof. Secondly when the handle knob is gripped in a manner in which the fingers approach the handle from the leading end portion thereof, (hereinafter "from an outer position" or the like) the fingers, that is, the thumb and forefinger, must spread open sufficiently to grip the handle knob by and between them, so that the handle knob cannot be gripped quickly.

Also, when performing the fishline winding operation, the outer peripheral shape of the handle knob forces the thumb of the angler to be put on the handle knob substantially along the axis of thereof and the forefinger to be placed on the handle knob in a direction extending substantially perpendicular to the axis thereof. This inevitably causes the angler to have a poor holding feeling It additionally forces the side of the angler to open wide so e.g., force the elbow forward that the angler is not able to carry out the fishline winding operation in a stable condition.

SUMMARY OF THE INVENTION

In view of the above, it is an object of the invention to provide a handle of a fishing rod which not only permits easy removal of a fishline when it is twined around a handle knob but also allows the handle knob to be gripped naturally and smoothly from an outer position thereof with the thumb and forefinger to thereby be able to carry out a fishline winding operation in a tight and stable condition.

In attaining the above object, according to the invention, there is provided a handle of a fishing rod of a type in what a handle knob is supported rotatably and retained in the end portion of a handle arm of a handle, to be mounted on the drive shaft of a reel main body, in which each of the hold surfaces of the handle knob to be gripped or pinched with the thumb and forefinger during the fishline winding operation is formed such that it is tapered from the base portion side of the handle arm toward the outer end portion side thereof.

In the handle of the fishing rod, the surface shape of each hold surface of the handle knob is preferably formed such that it gradually increases in height from the base portion side thereof toward the outer end portion side thereof.

Further, in the handle of the fishing rod, slippage preventive portions are preferably formed in the hold surfaces of the handle knob.

Since the handle knob is formed tapered toward the outer end portion thereof, if the fishline is twined around the handle knob, the fishline can be easily removed from its twined state. Also the handle knob can be easily gripped from an outer direction thereof with the fingertips.

In each of the cases in which the surface shape of each of the hold surfaces of the handle knob is formed so as to increase gradually in height toward the outer end portion thereof and in which the slippage preventive portions are formed on each of the hold surfaces of the handle knob, the fingers gripping the handle knob between them can be reliably prevented from slipping off the handle knob during the fishline winding operation.

BRIEF DESCRIPTION OF THE INVENTION

DETAILED DESCRIPTION OF THE PREFERRED EMBODIMENTS

The preferred embodiments of the present invention will now be described in detail with reference to the accompanying drawings.

Figure 1:
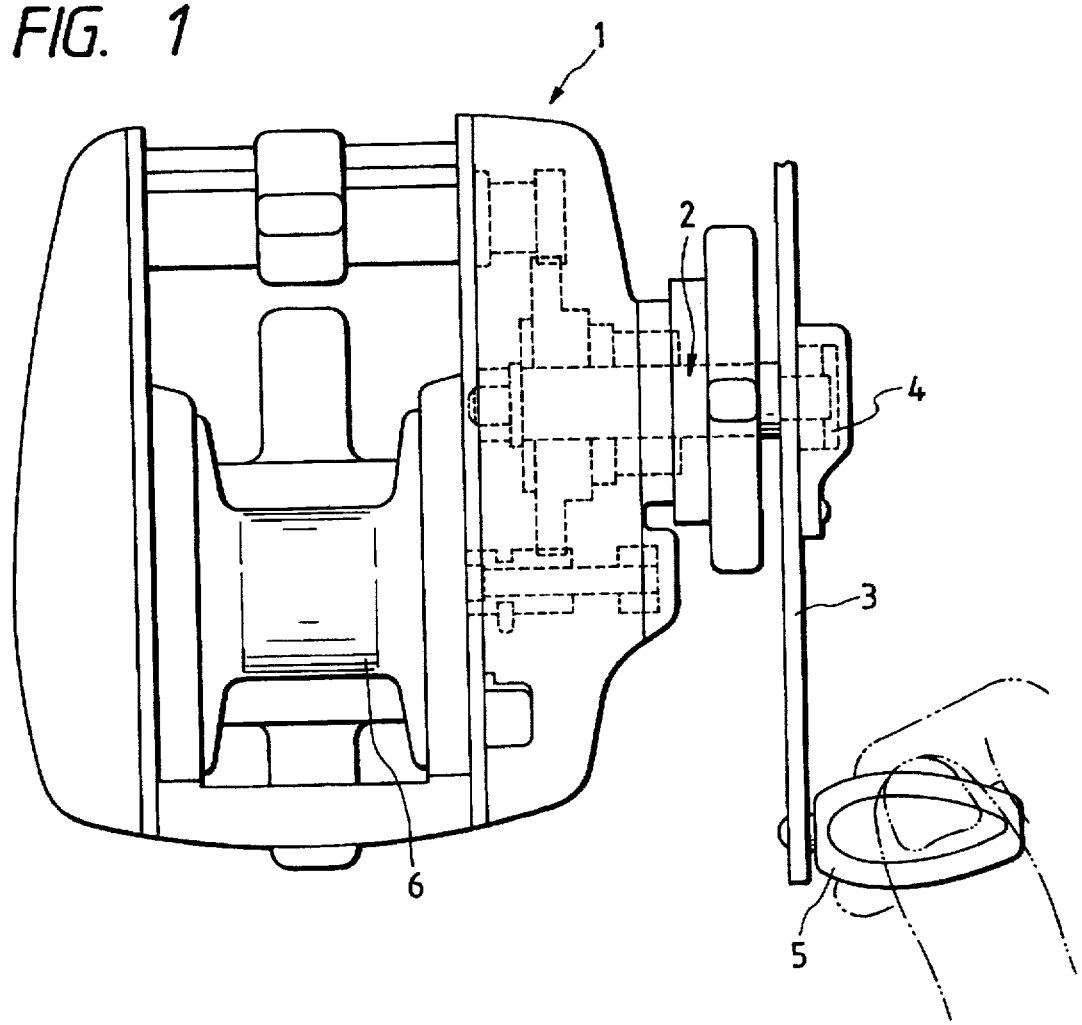
FIG. 1 is a plan view of a fishing reel equipped with a handle according to a first embodiment of the invention.
Figure 2:
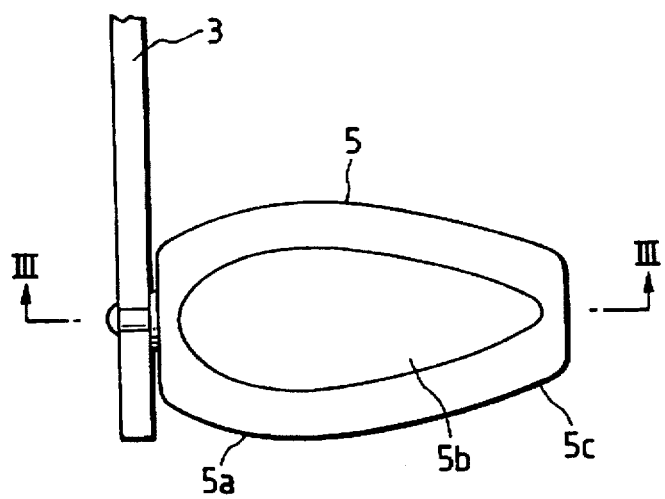
FIG. 2 is a plan view of the handle knob shown in FIG. 1.
Figure 3:
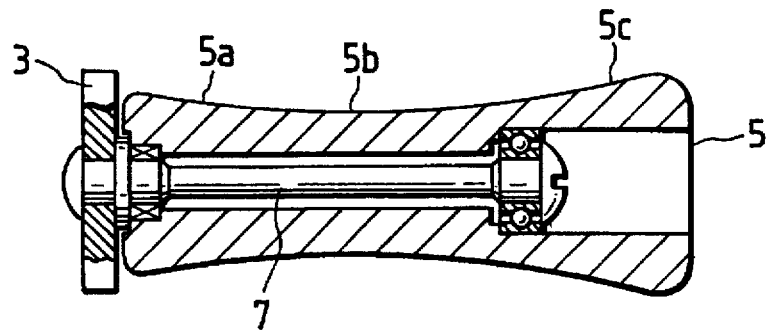
FIG. 3 is a section view taken along the line III—III of FIG. 2.

Firstly, in FIGS. 1 to 3, there is shown a handle for a fishing reel according to a first embodiment of the invention.

In FIG. 1, a handle arm 3 is fastened and fixed to a drive shaft 2 of a reel main body 1 by use of a nut 4 or the like; and a handle knob 5 is affixed to the end portion of the handle arm 3 rotatably and retained in place. In this structure, if the handle arm 3 is rotated while the handle knob 5 is being pinched with fingers, then the rotation of the handle arm 3 is transmitted to a reel mechanism through the drive shaft 2, so that a fishline can be wound around a spool 6.

Referring now to the structure of the handle knob 5, as shown in a plan view of FIG. 2, the whole plan shape of the handle knob 5 is formed such that it is tapered from the base portion 5a thereof toward the outer end portion 5c thereof. More specifically, the handle knob 5 is formed substantially into a pear shape or tapered oval with the most transversely expanded portion located nearer to a proximal end of the handle knob 5 rather than to a distal end thereof, as viewed in a plan view. In this embodiment, the base portion 5a corresponds to the most transversely expanded portion while the outer end portion 5c corresponds to the distal end.

In a sectional view of FIG. 3, each hold surface 5b of the handle knob 5 is formed into a radially inwardly concave or constricted shape.

As described above, since the outer configuration of the handle knob 5 as well as the hold surface 5b are formed substantially into the pear or tapered-oval shape as viewed in the plan view while the hold surface 5b is formed into the radially inwardly concave or constricted shape as viewed in a sectional or side view, and further since such handle knob 5 is mounted onto the handle arm 3 by means of a support shaft 7, even if the fishline is twined around the handle knob 5 due to loosening or twisting of the fishline during the fishline winding operation, the fishline can be easily removed therefrom along the taperedly inclined peripheries of the plan shape to avoid trouble with the twined fishline. Further, and unlike the conventional handle in which the handle knob is held unnaturally, by the fingers that is, the thumb is positioned substantially in line with the axis of the handle knob and a forefinger is placed on the handle knob in a direction extending substantially perpendicular to the handle knob axis, according to the first embodiment of the invention, as shown by chained lines in FIG. 1, the handle knob 5 can be naturally held with the thumb and forefinger to thereby perform a stable fishline winding operation while preventing the holding fingers from slipping off the handle knob 5 during the fishline winding operation.

Figure 4:
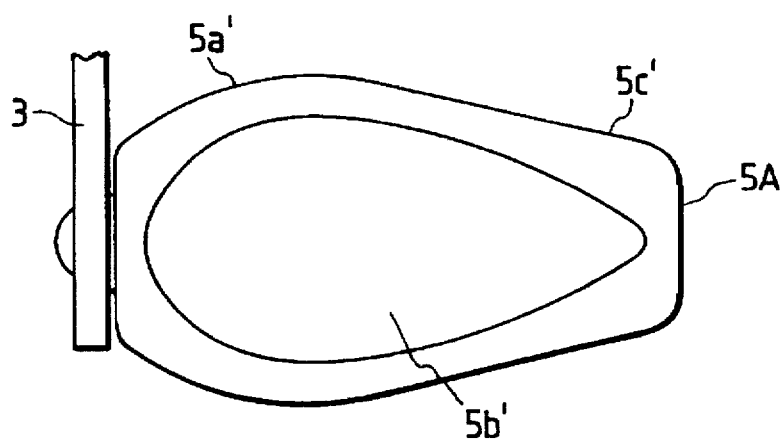
FIG. 4 is a plan view of a handle knob according to a second embodiment of the invention.

FIG. 4 shows a handle knob according to a second embodiment of the invention.

When compared with the handle knob 5 according to the first embodiment shown in FIG. 1 in which the outer configuration of the handle knob 5 is constructed only by radially outwardly expanded outer peripheries as viewed in the plan view, a handle knob 5A according to the second embodiment is structured such that the outer configuration of the handle knob 5A exhibits a combination of radially outwardly expanded outer peripheries and straightly inclined outer peripheries located proximate the outer end portion side 5c'as viewed in a plan view.

If the inclined portion is formed straight in this manner, then the handle knob 5A can be held from an outer position thereof more smoothly with the fingertips and also the twined fishline can be removed easily.

Figure 5:
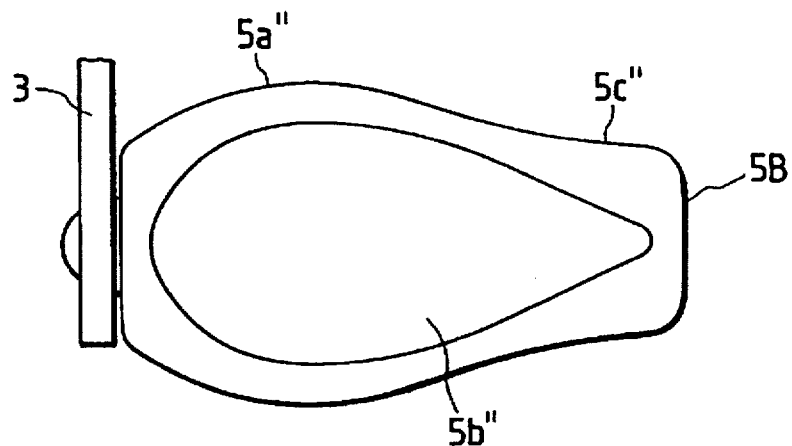
FIG. 5 is a plan view of a handle knob according to a third embodiment of the invention.

FIG. 5 shows a handle knob 5B according to a third embodiment of the invention.

Whereas the handle knob 5 according to the first embodiment shown in FIG. 1 is formed such that the taperedly inclined portion thereof expands radially outwardly as viewed in a plan view, the handle knob 5B according to the third embodiment is formed such that the outer configuration of the handle knob 5B exibits a combination of radially outwardly convex or expanded peripheries and radially inwardly concave or constricted peripheries.

By forming the handle knob 5B in this manner, when the fishline is twined around the handle knob 5B, the fishline can be easily removed therefrom and, at the same time, in cooperation with the hold surface 5b" thereof, the fingers holding the handle knob 5B between them can be prevented from slipping off the handle knob 5B during the fishline winding operation.

Figure 6:
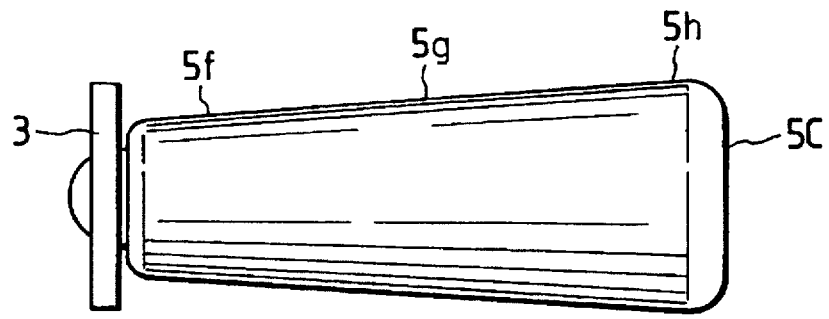
FIG. 6 is a side view of a handle knob according to a fourth embodiment of the invention.

FIG. 6 is a side view of a handle knob according to a fourth embodiment of the invention.

Whereas the handle knob 5 according to the first embodiment shown in FIG. 3 is structured such that each hold surface 5b has the radially inwardly constricted or concave shape as viewed in a sectional side view, a handle knob 5C according to the fourth embodiment is formed such that each hold surface 5g has a shape that gradually increases in height from its end proximate the handle arm 3 toward the outer end portion 5h and is formed in a straight manner as viewed in the side view.

By forming the hold surface of the handle knob 5C in a straight shape, while maintaining the easy holding of the handle knob 5C with the fingertips and preventing the holding fingers from slipping off the handle knob 5C, the whole shape of the handle knob 5C is simplified to thereby facilitate not only the removal of the fishline when it is twined around the handle knob 5C but also the molding of the handle knob 5C.

Figure 7:
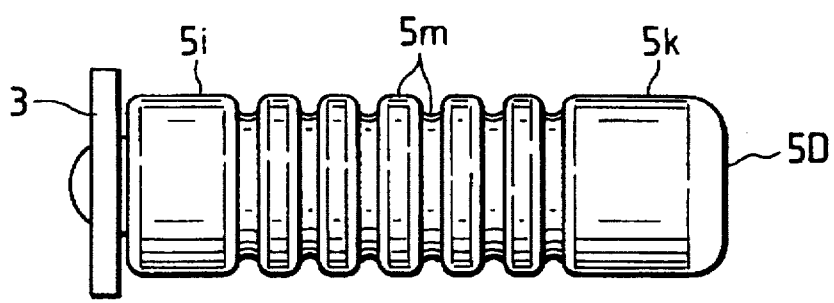
FIG. 7 is a side view of a handle knob according to a fifth embodiment of the invention.
Figure 8:
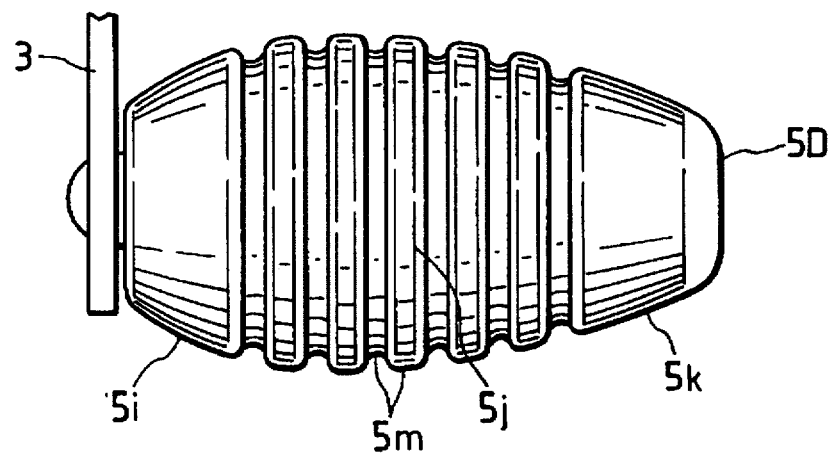
FIG. 8 is a plan view of the handle knob shown in FIG. 7.

FIGS. 7 and 8 show a handle knob according to a fifth embodiment of the invention.

The handle knob 5D according to the fifth embodiment is formed such that no height difference is formed among any portions of the hold surface 5j axially aligned from the base portion 5i toward the outer end portion 5k to provide a straight shape as viewed in a side view. A plurality of annular grooves are formed around the handle knob 5m to provide uneven portions 5d for preventing finger slippage.

In this embodiment, the slippage preventing uneven portions 5m prevent the holding fingers from slipping off the handle knob 5D during the fishline winding operation.

Figure 9:
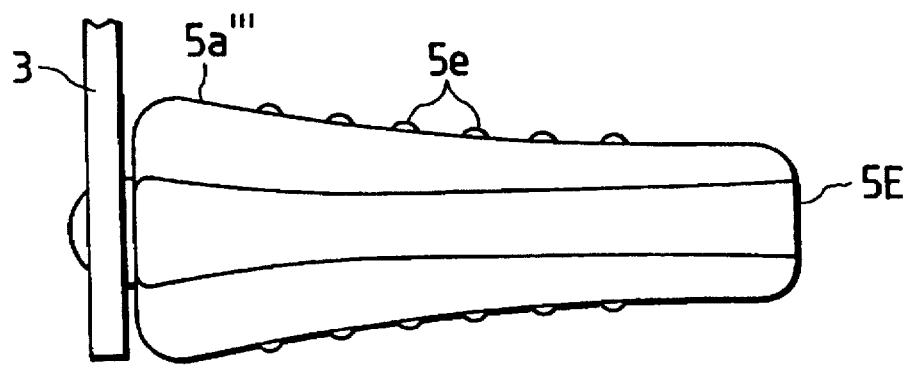
FIG. 9 is a side view of a handle knob according to a sixth embodiment of the invention.
Figure 10:
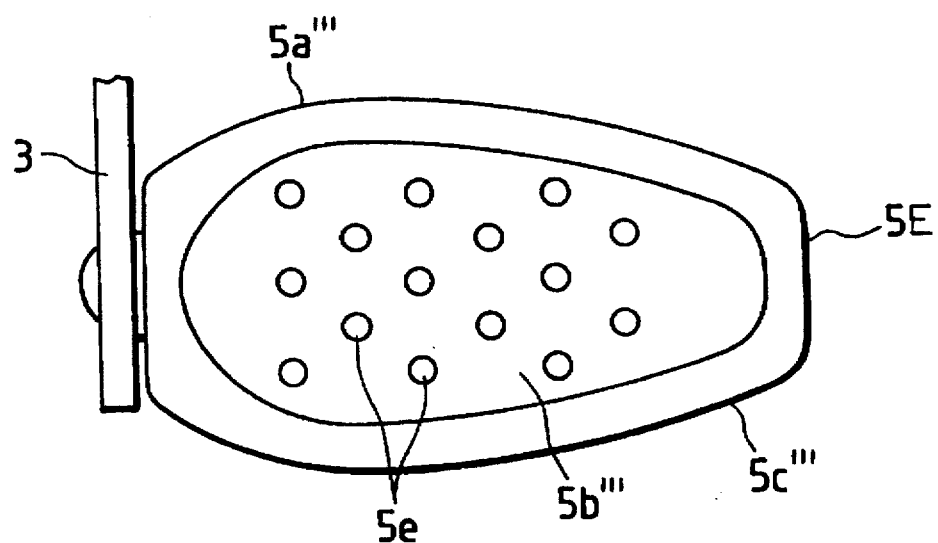
FIG. 10 is a plan view of the handle knob shown in FIG. 9.

FIGS. 9 and 10 show a handle knob according to a sixth embodiment of the present invention.

In the handle knob 5E according to the sixth embodiment, contrary to the embodiments respectively shown in FIGS. 3 and 6, the outer configuration of the hold surface 5b''' as viewed in a side view gradually decreases in height from the base portion 5a''' thereof toward the outer end portion side 5c''' thereof, and a plurality of projections 5e for slippage prevention are formed on the surface of the handle knob 5E.

According to the present embodiment, the handle knob 5E can be grasped easily with the fingertips from an outer position thereof. Also, the slippage preventing preventive projections 5e prevent the holding fingers from slipping off the handle knob 5E during the fishline winding operation.

Although a description has been provided above with reference to a handle for use in a double bearing type fishing reel, the present invention can be utilized similarly in a spinning fishing reel and other types of fishing reels as well.

As has been described hereinbefore, according to the invention, since the handle knob is formed such that it is tapered toward the outer end portion side thereof, even if the fishline is twined around the handle knob, the fishline can be easily removed therefrom and the handle knob can be naturally held with the thumb and forefinger, so that an angler is allowed to execute the fishline winding operation in a stable manner with the angler's side closed tight.

Also, according to the invention, since the surface shape of the hold surface of the handle knob is formed such that it gradually increases in height from the base portion thereof toward the outer end portion side thereof, and also since the slippage preventive portions are formed on the surface of the handle knob, the fingers holding the handle knob between them can be reliably prevented from slipping off the handle knob during the fishline winding operation.

What is claimed is:

1. A handle knob for a fishing reel, said handle knob being mounted on a handle arm and rotatable about an axis, wherein:

said handle knob is formed substantially into a pear shape as viewed in a first direction perpendicular to said axis;

said handle knob has a most-expanded portion that is located farthest from said axis as viewed in said first direction and that defines a widest diameter of said pear shape; and said most-expanded portion of said handle knob is located nearer to a first axial end of said handle knob proximate said handle arm rather than to a second axial end opposite thereof from said first axial end.

2. A handle knob according to claim 1, wherein said handle knob, as viewed in said first direction, is constructed by radially outwardly expanded peripheries extending between said first and second axial ends.

3. A handle knob according to claim 1, wherein said handle knob, as viewed in said first direction, is constructed by a combination of radially outwardly expanded peripheries each extending from said first axial end, and inclined linear peripheries extending from respective radially outwardly expanded peripheries to said second axial end.

4. A handle knob according to claim 1, wherein said handle knob, as viewed in said first direction, is constructed by a combination of radially outwardly expanded peripheries each extending from said first axial end, and radially inwardly constricted peripheries extending from respective radially outwardly expanded peripheries to said second axial end.

5. A handle knob according to any one of claims 1 to 4, wherein said handle knob has a pair of holding surfaces opposite from each other across said axis in said first direction, and each of said holding surfaces is formed into a pear shape as viewed in said first direction.

6. A handle knob according to claim 5, wherein each of said holding surfaces is radially inwardly constricted with respect to said axis as viewed in a second direction perpendicular to both said axis and said first direction.

7. A handle knob according to claim 5, wherein each of said holding surfaces is inclined so that a portion of said holding surface proximate said first axial end is closer to said axis than another portion of said holding surface proximate said second axial end, as viewed in a second direction perpendicular to both said axis and said first direction.

8. A handle knob according to claim 5, wherein each of said holding surfaces has a constant radial distance with respect to said axis as viewed in a second direction perpendicular to both said axis and said first direction.

9. A handle knob according to claim 5, wherein a plurality of small projections are formed on said holding surfaces.

10. A handle knob according to claim 1, wherein a plurality of annular grooves are formed around said handle knob.

11. A handle knob according to claim 1, wherein said handle knob, as viewed in said first direction, is symmetrical with respect to said axis.

12. A handle knob according to claim 1, wherein said handle knob, as viewed in said first direction, decreases gradually in diameter from said most-expanded portion to said second axial end.

13. A handle of a fishing reel including a handle knob supported rotatably in an end portion of a handle arm of the handle, wherein said handle is configured to be mounted on a drive shaft of a reel main body, wherein said handle knob is formed with hold surfaces, such that said hold surfaces thereof are adapted to be held with a thumb and forefinger during a fishline winding operation and are tapered from a base portion side of said handle knob proximate to said handle arm to an outer axial end of said handle knob.

14. A handle of a fishing reel as set forth in claim 13, wherein a surface shape of each of said hold surfaces of said handle knob is formed such that said surface shape gradually increases in height from said base portion side of said handle arm to said outer axial end thereof.

15. A handle of a fishing reel as set forth in claim 14, wherein slippage preventive portions are formed on each of the said hold surfaces of said handle knob.

16. A handle of a fishing reel as set forth in claim 13, wherein each of said hold surfaces, as viewed in a direction perpendicular to said hold surfaces, has a surface area that is bounded by a periphery and that decreases gradually in width from said base portion side to said outer axial end of said handle knob.

17. A handle of a fishing reel as set forth in claim 13, wherein each of said hold surfaces, as viewed in a direction perpendicular to said hold surfaces, is symmetrical with respect to an axis extending from said base portion side to said outer axial end of said handle knob.

* * * * *